US012612266B2

(12) United States Patent
Sullivan et al.

(10) Patent No.: US 12,612,266 B2
(45) Date of Patent: Apr. 28, 2026

(54) GRIPPING DEVICE MODALITIES

(71) Applicant: RightHand Robotics, Inc., Somerville, MA (US)

(72) Inventors: John Sullivan, Malden, MA (US); Lael Odhner, Medford, MA (US); Nicholas Payton, Somerville, MA (US); Andrew Clough, Cambridge, MA (US); Andrew Campanella, Somerville, MA (US)

(73) Assignee: RightHand Robotics, Inc., Charlestown, MA (US)

( * ) Notice: Subject to any disclaimer, the term of this patent is extended or adjusted under 35 U.S.C. 154(b) by 602 days.

(21) Appl. No.: 17/299,280

(22) PCT Filed: Jan. 31, 2020

(86) PCT No.: PCT/US2020/016078
§ 371 (c)(1),
(2) Date: Jul. 9, 2021

(87) PCT Pub. No.: WO2020/160394
PCT Pub. Date: Aug. 6, 2020

(65) Prior Publication Data
US 2022/0048717 A1 Feb. 17, 2022

Related U.S. Application Data

(60) Provisional application No. 62/799,414, filed on Jan. 31, 2019.

(51) Int. Cl.
*G06F 17/00* (2019.01)
*B25J 13/08* (2006.01)
(Continued)

(52) U.S. Cl.
CPC .......... *B65G 47/917* (2013.01); *B25J 13/082* (2013.01); *B25J 15/0616* (2013.01); *B65G 2203/041* (2013.01)

(58) Field of Classification Search
CPC ........... B65G 47/917; B65G 2203/041; B65G 1/1376; B65G 1/1378; B65G 47/905;
(Continued)

(56) References Cited

U.S. PATENT DOCUMENTS

| | | |
|---|---|---|
| 2001/0045755 A1 | 11/2001 | Schick et al. |
| 2009/0285664 A1 | 11/2009 | Kim et al. |
(Continued)

FOREIGN PATENT DOCUMENTS

| | | | |
|---|---|---|---|
| CA | 3029834 A1 | 1/2018 | |
| CA | 3149178 A1 * | 2/2021 | .............. B25J 13/00 |
(Continued)

OTHER PUBLICATIONS

Robot Grippers Explained (Year: 2020).*
(Continued)

*Primary Examiner* — Ronnie M Mancho
(74) *Attorney, Agent, or Firm* — Danielson Legal LLC

(57) ABSTRACT

Robotic gripping devices and methods for performing a picking operation. The methods described herein may involve positioning a gripping device with respect to an item to be grasped and then executing a first picking operation using the gripping device to obtain a grasp on the item. The methods may then involve executing at least two of a force detection procedure to detect a force applied to a portion of the gripping device, a grasping space detection procedure to detect an item in grasping range of the gripping device, a pressure detection procedure configured to detect pressure in an airflow path, and an item load detection procedure to detect force in a mechanical load path of the gripping device.

19 Claims, 9 Drawing Sheets

(51) Int. Cl.
B25J 15/06          (2006.01)
B65G 47/91          (2006.01)
(58) Field of Classification Search
CPC ........ B65G 47/90; B65G 47/91; B25J 13/082;
B25J 15/0616; B25J 9/1612; B25J
15/0206; B25J 15/10; G05B 2219/39466;
G05B 2219/39505; G05B 2219/39514;
G05B 2219/39528; G05B 2219/39531;
G05B 2219/39532
USPC ........................................................ 700/258
See application file for complete search history.

(56)                References Cited

U.S. PATENT DOCUMENTS

| | | | | |
|---|---|---|---|---|
| 2011/0067520 | A1 * | 3/2011 | Ihrke | B25J 9/104 |
| | | | | 901/28 |
| 2013/0034420 | A1 * | 2/2013 | Hjornet | B25J 15/0616 |
| | | | | 414/752.1 |
| 2014/0277742 | A1 | 9/2014 | Wells et al. | |
| 2015/0028613 | A1 | 1/2015 | Nakayama | |
| 2016/0158942 | A1 * | 6/2016 | Augenbraun | G05D 1/0227 |
| | | | | 901/10 |
| 2019/0061170 | A1 * | 2/2019 | Curhan | B25J 15/0616 |
| 2022/0048717 | A1 * | 2/2022 | Sullivan | B25J 15/10 |

FOREIGN PATENT DOCUMENTS

| | | | | |
|---|---|---|---|---|
| DE | 19817426 | B4 | 6/2004 | |
| EP | 2468451 | A2 * | 6/2012 | ............. B25B 11/00 |
| WO | 2017067661 | A1 | 4/2017 | |
| WO | 2018017616 | A1 | 1/2018 | |
| WO | WO-2021021807 | A1 * | 2/2021 | ............. B25J 13/00 |

OTHER PUBLICATIONS

Extended European Search Report for European Application No. 20748541.8, PCT/US2020/016078, Sep. 28, 2022, 11 pages.
Hirzinger G et al. "Sensor-based space-robotics-rotex and its telerobotic features" IEEE Transactions on Robotics and Automation, IEEE Inc, New York, US. vol. 9, No. 5, pp. 649-663, Oct. 1, 1993.
International Search Report for PCT/US2020/016078, May 18, 2020, 2 pages.
Written Opinion for PCT/US2020/016078, May 18, 2020, 7 pages.
First Office Action for Chinese Patent Application No. 202080012228.6 PCT/US2020/016078, Nov. 18, 2022, 5 pages.
EP Pat. Appl. No. 20748541.8, Article 94(3) EPC Communication dated, Mar. 21, 2025. 12 pages.
Canadian Pat Appl. No. 3,123,057, Office Action dated Jun. 27, 2025. 4 pages.
Anonymous: "Dual modular redundancy—Wikipedia", Mar. 7, 2014 (Mar. 7, 2014), pp. 1-02 XP093260220, Retrieved from the INternet:URL:https://en.wikipedia.org/w/index.php?title=Dual_modular_redundancy*oldid=598554223.
March: "Developing Safety Critical Applications that Meet IEC 61508 Standards Using System-on-Chip Devices with Embedded ARM Cortext-M3 and FPGA",, Mar. 31, 2013 (Mar. 31, 2013), pp. 1-14, XP093260224.

* cited by examiner

404

402

408

410

402

406

408

410

404

502

504

502

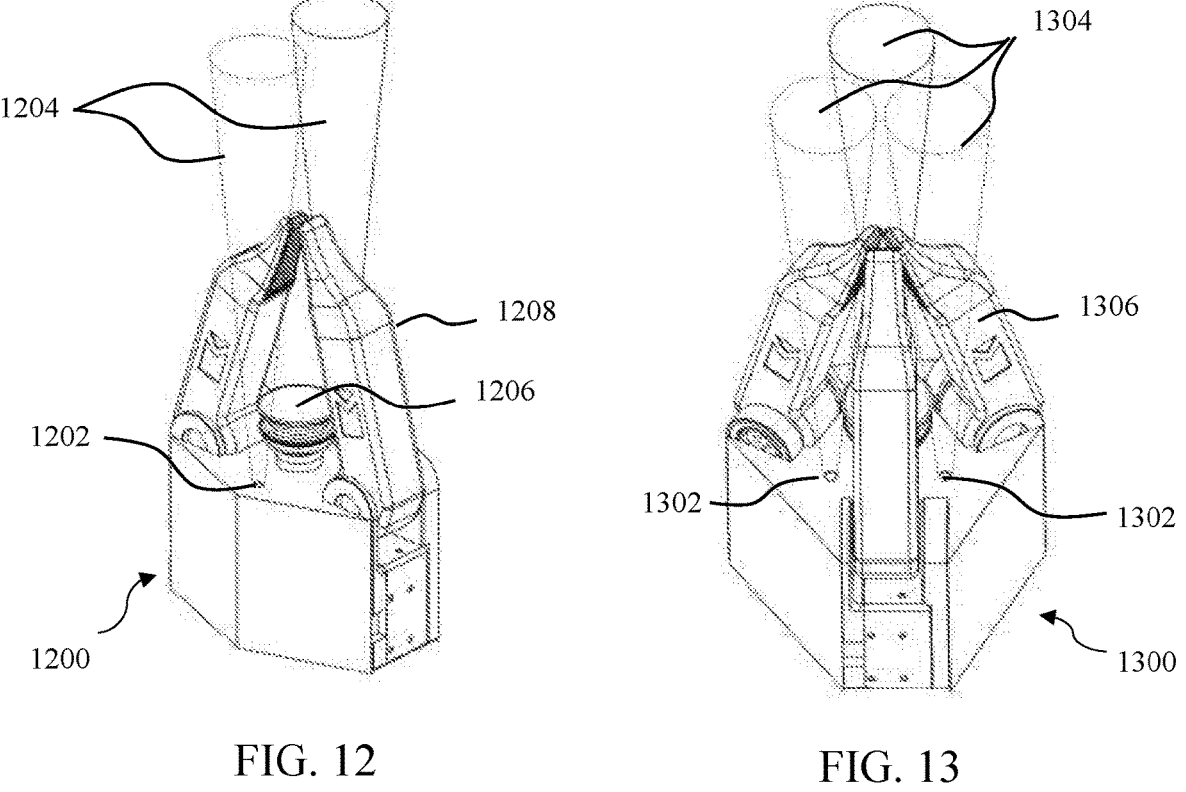
FIG. 12                    FIG. 13

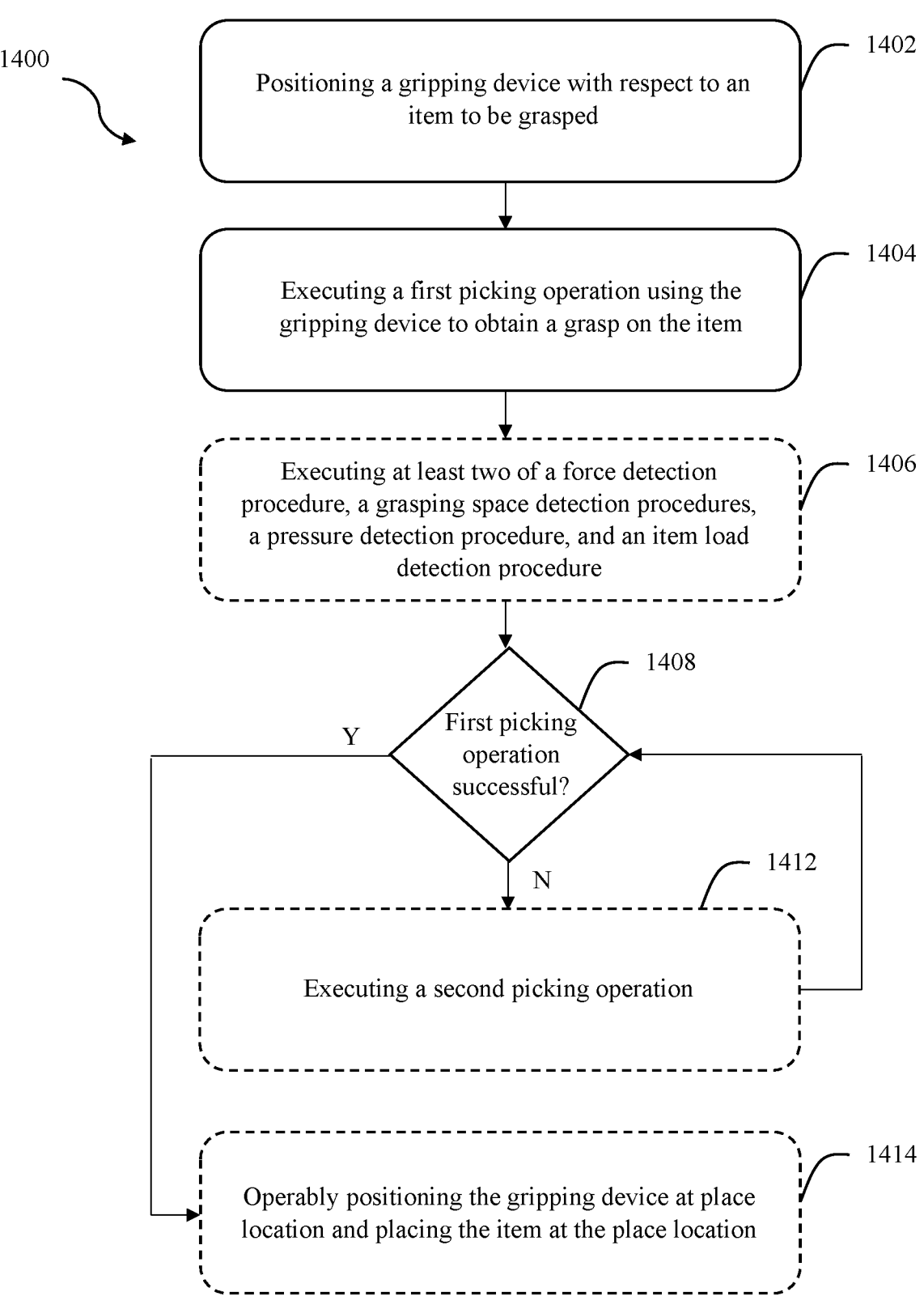

1400

Positioning a gripping device with respect to an item to be grasped — 1402

Executing a first picking operation using the gripping device to obtain a grasp on the item — 1404

Executing at least two of a force detection procedure, a grasping space detection procedures, a pressure detection procedure, and an item load detection procedure — 1406

First picking operation successful? — 1408

Y

N

Executing a second picking operation — 1412

Operably positioning the gripping device at place location and placing the item at the place location — 1414

FIG. 14

GRIPPING DEVICE MODALITIES

CROSS-REFERENCE TO RELATED APPLICATIONS

The present application is the national phase of International (PCT) Patent Application No. PCT/US2020/016078, filed internationally on Jan. 31, 2020, and claims the benefit of and priority to co-pending U.S. provisional application No. 62/799,414, filed on Jan. 31, 2019, the entire disclosure of which is incorporated by reference as if set forth in its entirety herein.

TECHNICAL FIELD

Embodiments described herein generally relate to robotic devices and methods and, more particularly but not exclusively, to robotic devices and methods for performing picking operations.

BACKGROUND

Logistic operations such as those in warehouse environments often include robotic gripping devices to take items from a first location (e.g., a container) and place the items at a second location (e.g., on a conveyor belt). These robotic solutions are typically tailored to a narrow class of pick items.

Existing techniques to detect whether these robotic gripping devices have successfully grasped an item often involve the use of tactile feedback sensors. These sensors are expensive and fragile, however, which limits their widespread use in industrial settings.

Another technique to detect whether a robotic gripping device has successfully grasped an item relies on externally-mounted 3D cameras with a good view of the gripping device. This technique, however, requires the gripping device to move in front of the camera(s) and ultimately results in slower pick times. This technique also does not provide continuous detection, and will not detect if a gripping device drops a previously-grasped item after it passes in front of the camera(s).

Yet another technique involves placing a weight scale underneath the pick-and-place locations for verification. This technique, however, requires the gripping device to complete a full pick-and-place operation before determining success, which limits cycle time. Similarly, detection can be performed by imaging the "place" location for an item that was not there previously. However, this also limits cycle time.

Other existing techniques rely on human or manual verification. For example, after a gripping device executes a grasp attempt, a human operator may check and verify that the gripping device actually grasped the item. However, this technique is undesirable as it is labor intensive and expensive.

A need exists, therefore, for robotic devices and methods that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a system for performing a picking operation. The system includes a gripping device configured to execute a first picking operation to obtain a grasp on an item; a control module; and at least two of a force detection modality configured to detect a force applied to a portion of the gripping device to determine whether the gripping device has obtained a grasp on the item, a grasping space modality configured to detect an item in grasping range of the gripping device to determine whether the gripping device has obtained a grasp on the item, a pressure detection modality configured to detect pressure in an airflow path to determine whether the gripping device has obtained a grasp on the item, and an item load detection modality configured to detect force in a mechanical load path of the gripping device to determine whether the gripping device has obtained a grasp on the item.

In some embodiments, the gripping device is further configured to execute a second picking operation to obtain a grasp on the item upon the control module determining the first picking operation did not obtain a grasp on the item based on output from the at least two modalities.

In some embodiments, the system is configured to operably position the gripping device at a place location upon the control module determining the first picking operation did obtain a grasp on the item based on output from the at least two modalities, and wherein the gripping device is further configured to place the item at the place location.

In some embodiments, the gripping device includes at least one finger portion, one of the at least two modalities is the force detection modality, and the force detection modality is configured to detect a force applied to the at least one finger portion.

In some embodiments, one of the at least two modalities is the force detection modality, and the force detection modality is configured to detect a force generated by a portion of the gripping device by measuring at least one of air pressure, motor torque, series elastic deflection, servo tracking error, and rotational position of at least one finger portion.

In some embodiments, the control module is configured to instruct the gripping device to execute a second picking operation upon a first one of the at least two modalities outputting a classification that the gripping device grasped the item and a second one of the at least two modalities outputting a classification that the gripping device did not grasp the item.

In some embodiments, the at least two modalities are the pressure detection modality and the item load detection modality and the pressure detection modality includes a pressure sensor embedded in a structure of the gripping device to detect suction force from a suction device, and the item load detection modality includes a strain gauge operably positioned within the structure to detect a load force resultant from lifting the item.

In some embodiments, the at least two modalities are the force detection modality and the grasping space modality, wherein the force detection modality includes at least one finger portion configured to grasp the item, the grasping space modality includes at least one range-based sensor that is operably mounted on the gripping device to view a grasping space, and wherein the at least one finger portion and the at least one range-based sensor are operably positioned so that the finger portion does not interfere with the view of the grasping space. In some embodiments, the range-based sensor is operably positioned within a palm of the gripping device. In some embodiments, one of the at least two modalities is the force detection modality and the force detection modality includes at least one finger portion configured to grasp the item, the finger portion including a first segment configured with a Hall Effect sensor, a second segment configured with a magnet, and a bend point operably positioned between the first segment and the second segment, wherein the Hall Effect sensor generates a signal indicative of whether the finger portion has grasped an item, the generated signal based on a distance between the magnet of the second segment and the Hall effect sensor of the first segment.

In some embodiments, the at least two modalities comprise sensors configured with the gripping device.

According to another aspect, embodiments relate to a method for performing a picking operation. The method includes positioning a gripping device with respect to an item to be grasped; executing a first picking operation using the gripping device to obtain a grasp on the item; and executing, to determine whether the gripping device has obtained a grasp on the item, at least two of a force detection procedure to detect a force applied to a portion of the gripping device, a grasping space detection procedure to detect an item in grasping range of the gripping device, a pressure detection procedure configured to detect pressure in an airflow path, and an item load detection procedure to detect force in a mechanical load path of the gripping device.

In some embodiments, the method further includes executing a second picking operation to obtain a grasp on the item upon determining the first picking operation did not obtain a grasp on the item based on output from the at least two procedures.

In some embodiments, the method further includes operably positioning the gripping device at a place location upon determining the first picking operation did obtain a grasp on the item based on output from the at least two procedures, and placing the item at the place location.

In some embodiments, the gripping device includes at least one finger portion, one of the at least two procedures is the force detection procedure, and executing the force detection procedure includes measuring at least one of current draw, torque output, air pressure, air flow rate, and rotational position of at least one finger portion.

In some embodiments, the method further includes receiving a first classification from a first one of the at least two procedures indicating that the item has been grasped, receiving a second classification from a second one of the at least two procedures indicating that the item has not been grasped, and executing a second picking operation.

In some embodiments, the at least two procedures are the pressure detection procedure and the item load detection procedure, and executing the pressure detection procedure includes detecting a suction force in a structure operably connected to a suction device, and executing the item load detection procedure includes detecting a load force resultant from lifting the item.

In some embodiments, one of the at least two procedures is the force detection procedure, and the gripping device includes at least one finger portion including a first segment configured with a Hall Effect sensor, a second segment configured with a magnet, and a bend point operably positioned between the first segment and the second segment, wherein executing the force detection procedure includes detecting a signal indicative of whether the finger portion has grasped an item, the generated signal based on a distance between the magnet of the second segment and the Hall effect sensor of the first segment.

In some embodiments, the method further includes determining that the first picking operation was successful upon at least one of the procedures outputting a classification that the picking operation was successful.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

FIG. 12 illustrates a gripping device that includes finger portions, a suction device, and imagery sensor devices in accordance with one embodiment;

FIG. 13 illustrates a gripping device that includes finger portions, a suction device, and imagery sensor devices in accordance with another embodiment; and FIG. 14 depicts a flowchart of a method for performing a picking operation in accordance with one embodiment.

DETAILED DESCRIPTION

Figure 1:
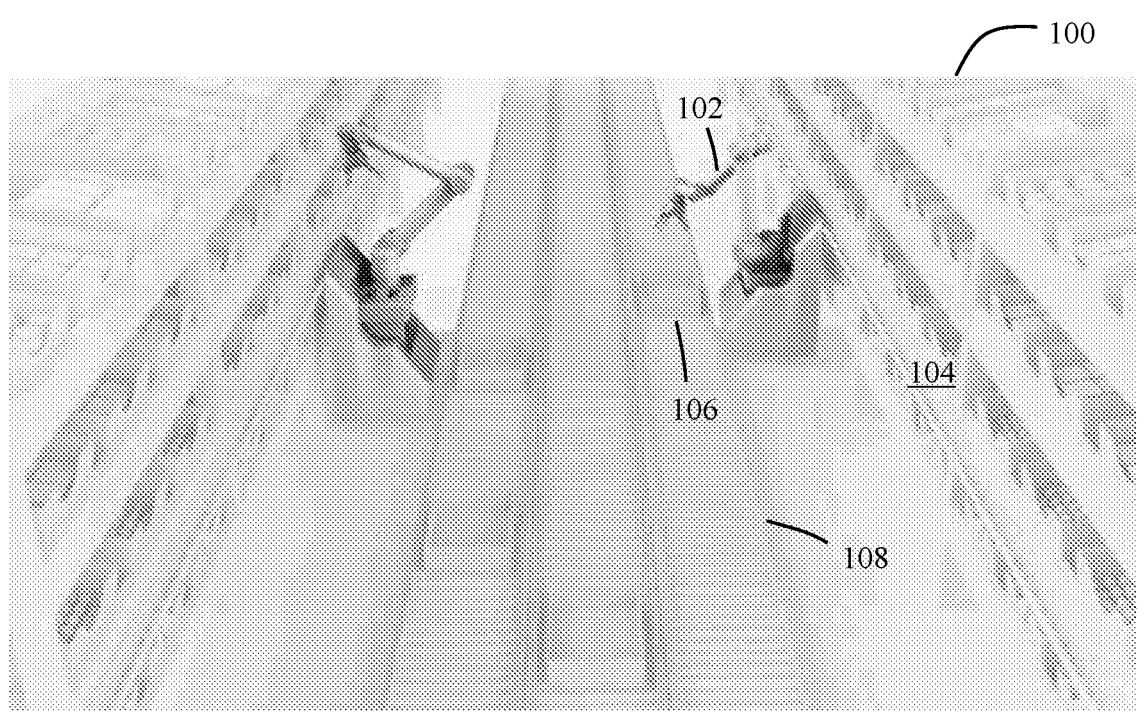
FIG. 1 illustrates a gripping device in a warehouse environment in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

As discussed previously, existing systems and methods for determining whether a robotic gripping device has grasped an item suffer from various drawbacks. These drawbacks may relate to any one or more of cost, cycle time, and labor intensiveness.

The embodiments described herein provide novel automatic systems and methods for detecting whether a robotic gripping device (for simplicity, "gripping device") has successfully grasped an item that overcome the drawbacks of existing techniques. The systems and methods herein rely on a novel combination of sensor modalities to determine the outcome of a picking operation. The modalities may be grouped by or otherwise defined based on what they detect or what they measure. These modalities include: (1) a force modality; (2) a grasping space modality; (3) a pressure detection modality; and (4) an item load detection modality.

The geometry of the gripping device provides a novel way to integrate the components of the implemented modalities as well. The components of the modalities used may be positioned in such a way that their operation is minimally impacted by other components. At the same time, the placement of these components may be optimized to monitor as much as possible of the space that may contain an item.

The devices and methods described herein may be implemented in a number of environments and for a number of applications. FIG. 1 illustrates a warehouse environment 100 in which one or more gripping devices 102 may be tasked with performing pick-and-place operations. For example, the gripping device 102 may comprise an arm portion (e.g., formed of a plurality of arm segments or links) and an end effector and may be tasked with picking an item from a shelving unit 104 and then placing the item in a container 106. The container 106 may be on conveyor belt 108 configured to move the container 106 to and from the gripping device 102. Additionally or alternatively, the gripping device 102 may be tasked with picking items from the container 106 and placing the items in a shelving unit 104, put wall, storage location, another bin or container, or the like.

Figure 2:
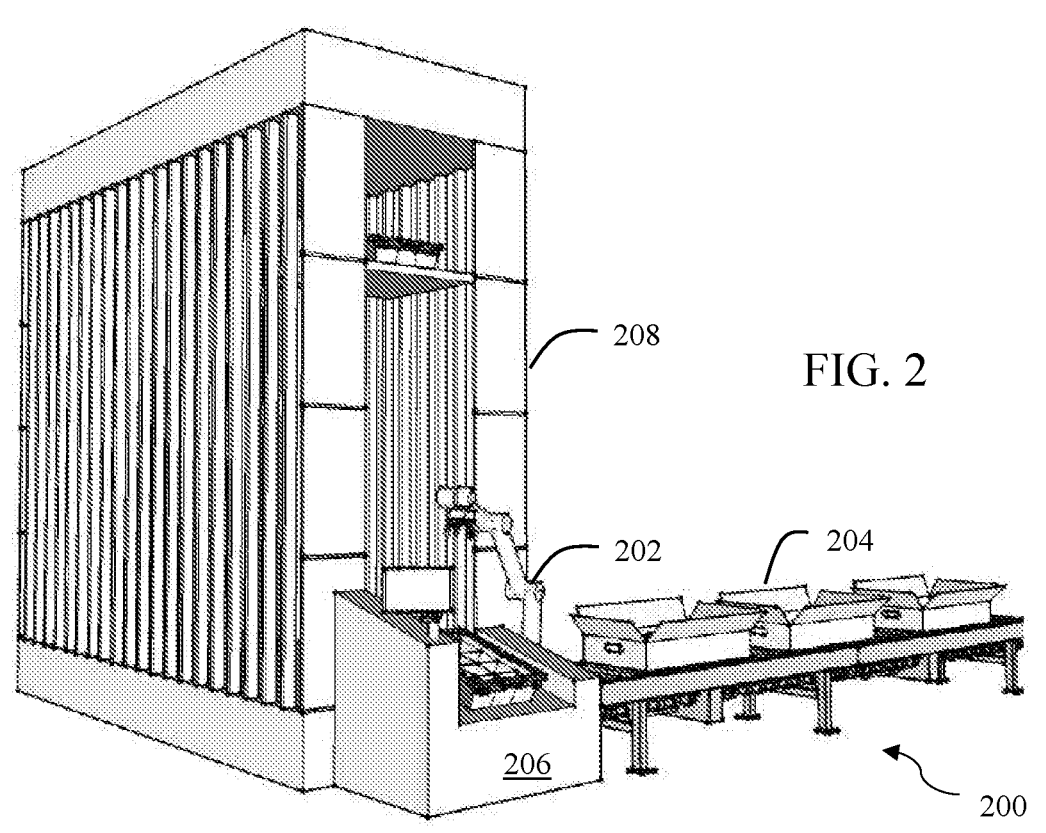
FIG. 2 illustrates a gripping device in a warehouse environment in accordance with another embodiment.

FIG. 2 illustrates another exemplary application in a warehouse environment 200 in which a gripping device 202 may be tasked with picking items from one or more containers 204, and placing the items at a loading station 206. These items may then be placed in a shipping container 208 for further shipment, sorting, processing, or the like.

Figure 3:
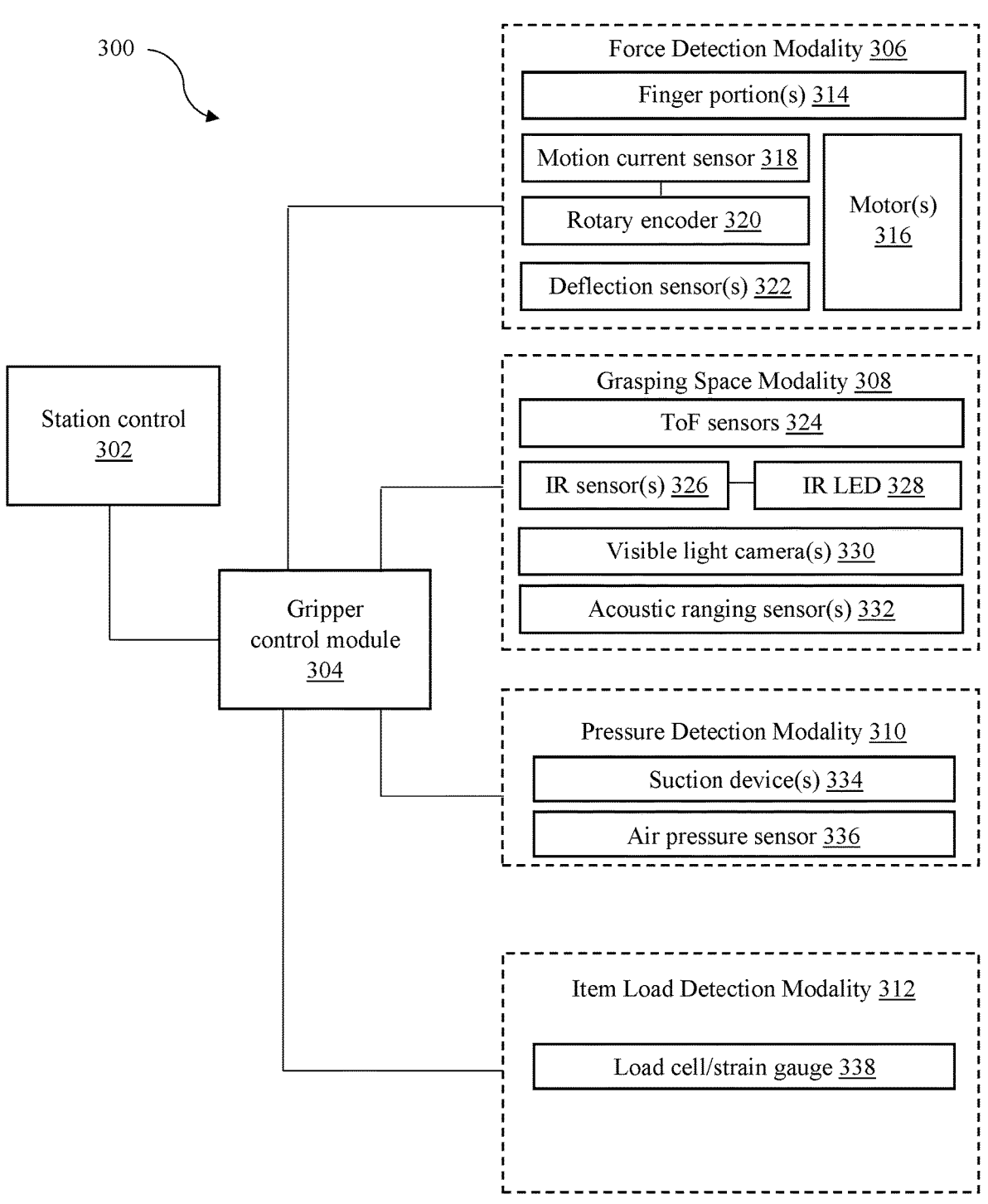
FIG. 3 illustrates a diagram of a system for performing a picking operation in accordance with one embodiment.

FIG. 3 illustrates a system 300 for performing a picking operation in accordance with one embodiment. The system 300 may include a station controller 302, a gripper control module 304, and at least two of the force detection modality 306, the grasping space modality 308, the pressure detection modality 310, and the item load detection modality 312.

The station controller 302 may be in operable communication with the gripper control module 304 and may control components related to the gripping device's environment. For example, the station controller 302 may issue commands to other external systems such as conveyor belts to move item-storing containers to and from the gripping device. The station controller 302 may also issue commands to the gripping device and components thereof. For example, the station controller 302 may control whether power is supplied to the gripping device.

The station controller 302 may issue commands to external systems in the gripping device's environment. The devices and methods described herein may be implemented in a number of environments and for a number of applications such as those shown in FIGS. 1 & 2.

The gripper control module 304 may be in operable communication with the station controller 302 and may issue commands to the implemented modalities 306-12. For example, the gripper control module 304 may perform any required analyses and instruct components of the implemented modalities to execute grasp attempts.

The first modality shown in FIG. 3 is the force detection modality 306. The force detection modality 306 generally relies on the detection of force or pressure exerted on some component(s) of the gripping device. For example, if the gripping device is configured with components such as finger portions to grasp an item, the force detection modality 306 may rely on sensors that measure the force applied to move the finger portion(s) and/or the force applied to the finger portion(s) by external items.

These measurements may be gathered in a variety of ways. The force detection modality 306 may include or otherwise use one or more finger portion(s) 314, motor(s) 316, a motion current sensor 318, a rotary encoder 320, and deflection sensor(s) 322.

The finger portion(s) 314 may contact the item when executing a grasp attempt and may be formed from solid polyuerthane rubber that is molded to form a plurality of linkages separated by hinges. These hinges may provide both flexibility and a spring force for compliance as well as for returning the finger portion(s) 314 to a neutral position. The finger core(s) may include wires that pass through a gasket into the center of an axle therein to deliver power and other data to and from the finger portion(s) 314.

In other embodiments, a pneumatic actuator may close or open the finger portion(s) 314 with a return spring to provide motion in the opposite direction. Similarly, a dual-acting pneumatic actuator could be used to drive the finger portion(s) 314 in both directions.

Each finger portion 314 may have magnets embedded in the linkages that operate with Hall effect sensors (discussed below). In this configuration, deflection of the finger portion(s) 314 cause the magnets to shift relative to one or more of the sensor(s). The resultant signal(s) may help determine how much deflection the associated finger portion 314 is experiencing. Additionally, these signal(s) may provide data regarding the direction of the load.

The finger portions 314 may be compliant so that they conform to the grasped item when actuated. The grasp can be further improved by shaping the finger portions so that, when actuated, they curve toward the item in a way so as to wrap around the item.

In the embodiment of the force modality 306 shown in FIG. 3, the finger portion(s) 314 may be actuated by the motor 316. In this case, a motion current sensor 318 can be inserted in series with the power supply (not shown in FIG. 3) for the motor 316. The current consumed by the motor 316 is tightly correlated to the torque output by the motor 316.

The motor torque can also be compared to the position of the finger portion(s) 314. A rotary encoder 320 can be used at the axle at the base of a finger portion 314 to measure the position thereof. The rotational position of the finger portion 314 may be correlated to the input current of the motor 316 and is tightly correlated to the presence of an item pushing back against the finger portion 314. If the finger portion 314 is actuated in a linear fashion or with a linkage, then other types of position encoders can be employed.

When a finger portion 314 is instructed to close in on or otherwise contact an item as part of a picking operation, the finger portion 314 would likely contact an item before reaching the position that it would reach if there was no item present. With above-described components, the operation of the finger portion(s) 314 may rely on one or more of two principles. First, this contact and subsequent application of pressure on the item will result in a measurable increase in current. Second, the finger portion(s) 314 will eventually stop moving and will not reach its commanded position. This may indicate approximately how much force the finger portion 314 is placing on the item, as well as the item's size.

Figure 4A:
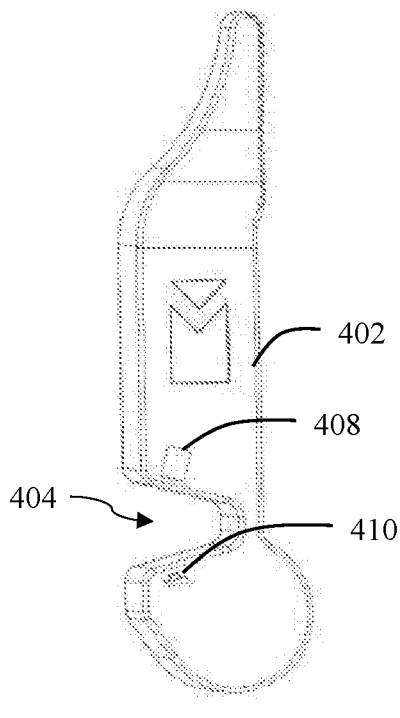
FIGS. 4A & B illustrate a finger portion contacting an item in accordance with one embodiment.

FIGS. 4A & B illustrate a finger portion 402 in accordance with one embodiment. For example, the finger portion 402 shown in FIG. 4A may include a flexure portion 404 and be in a neutral position. The flexure portion 404 may provide the finger portion 402 with a degree of flexibility, particularly when the finger portion 402 contacts an item.

Figure 4B:
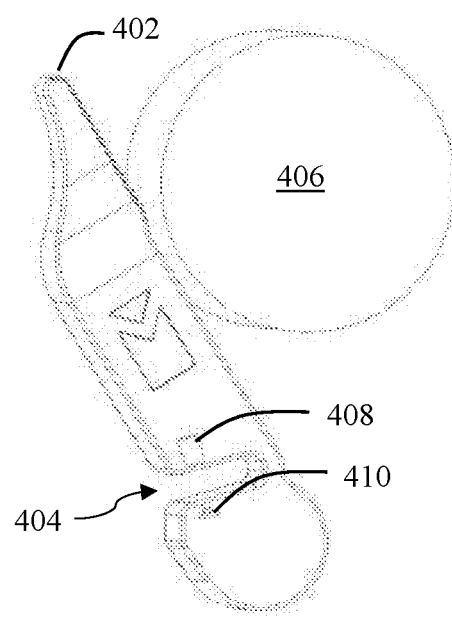

FIG. 4B illustrates the finger portion 402 contacting an item 406. The finger portion 402 may rotate about an axle (not shown in FIGS. 4A & B), and may achieve some flexibility during the contact with the item 406 due to the flexure portion 404.

FIGS. 4A & B also illustrate a magnet 408 that is embedded in or otherwise configured with a first segment of the finger portion 402, and a Hall Effect sensor 410 that is embedded in or otherwise configured with another segment of the finger portion 402. That is, the magnet 408 and the Hall Effect sensor 410 are located on opposite sides of the flexure portion 404.

At the orientation shown in FIG. 4A, the Hall Effect sensor 410 may have a first reading that corresponds to the position of the magnet 408 with respect to the Hall Effect sensor 410. This reading is based on the distance between the magnet 408 and the Hall Effect sensor 410.

As seen in FIG. 4B, however, the finger portion 402 is contacting the item 406 and the distance between the magnet 408 and the Hall Effect sensor 410 has changed. This change in distance would result in a different reading obtained by the Hall Effect sensor 410. Accordingly, the distance between the magnet 408 and the Hall Effect sensor 410 (and therefore the reading provided by the Hall Effect sensor 410), may be indicative of whether or not the finger portion 402 has grasped an item.

Figure 5A:
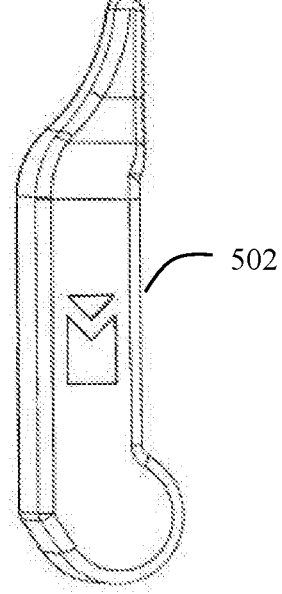
FIGS. 5A & B illustrate a finger portion contacting an item in accordance with another embodiment.

FIGS. 5A & B illustrate a finger portion 502 in accordance with another embodiment. The finger portion 502 of FIGS. 5A & B may be similar to the finger portion 402 of FIGS. 4A & B, but does not include a flexure portion. That is, the finger portion 502 is a more rigid component than the finger portion 402 of FIGS. 4A & B.

Figure 5B:
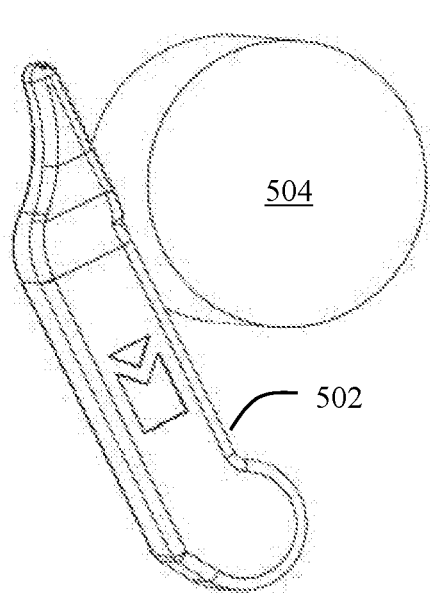

FIG. 5A illustrates the finger portion 602 in a "commanded" position in which no item is present. FIG. 5B, on the other hand, illustrates the finger portion 502 in contact with an item 504.

The force applied to a finger portion by an external item can additionally or alternatively be detected using sensor devices within the finger portion itself (e.g., as in FIGS. 4A & B). The finger portion(s) can be designed in such a way that the force imparted thereon by an item causes the finger portion to deform in an expected way. Knowledge regarding the expected deformation can be leveraged by applying a sensor device, which can in turn detect the force imparted on the finger portion by the item being grasped.

As discussed above in conjunction with FIGS. 4A & B, one such implementation of this type of sensor includes magnets mounted on one side of a bend point of a finger portion and Hall Effect sensors mounted on the other side of the bend point. The degree to which the finger portion is bent correlates to the distance of the magnets from the Hall Effect sensors. The output of the Hall Effect sensors is therefore tightly correlated to the force on the finger portion.

By using an array of magnet-sensor pairs such as those in FIGS. 4A & B, the contrast of the measurement-to-noise can be increased and more than one direction of force can be measured. For instance, multiple magnet-sensor pairs can be added at various locations of a figure portion, effectively measuring the opposite of the inside pair and creating a pseudo-differential measurement. Likewise, pairs can be mounted parallel to the line of a bend point to measure twist or lateral forces applied to the finger portion.

If the finger portions are constructed of a more rigid material, then resistive strain gauges could be applied on either side of the bend point (as with a load cell) to detect force imparted on the finger portion. Low-range infrared proximity sensors could also be positioned in such a way to measure the bending motion of the finger portion reducing the range between two points on the finger portion.

Referring back to FIG. 3, the motor 316 may be an off-the-shelf motor (e.g., a Dynamixel XM 430 W210) with a machined frame, for example. Regardless of the exact configuration, the motor(s) 316 may drive one or more finger portion(s) 314. For example, the motor(s) 316 may be in operable connectivity with a series of gears to transmit torque to the rotational axis of the finger portion(s) 314. There are many variations on motor and gear designs that could result in higher or lower torques, smaller size, faster finger portion actuation, or other desirable properties. Accordingly, the amount of finger portion deflection may be determined by monitoring torque as well. The exact size or configuration of these components may vary as long as the features of the embodiments described herein may be accomplished.

The motion current sensor 318 may measure current in wire(s) connected to the finger portion(s) 314. In some embodiments, a rotary encoder 320 may be connected to a portion of the finger portion(s) 314 such that it can measure the rotational position thereof. For example, rotary encoders 320 may be configured with an axle at the base of a finger portion 314 to detect if (and to what degree) the finger portion 314 rotates. The above embodiments are merely exemplary and other types of deflection sensors 322, such as the magnet-Hall Effect sensor pairs may be used as long as the features of the objectives of the embodiments described herein may be accomplished.

Referring back to FIG. 3, the second modality shown is the grasping space modality 308. The grasping space modality 308 refers to the application of sensors such as range-based sensors that monitor the space that an item, if appropriately grasped, might occupy. There are many different types of sensors that could be used in this modality 308 including, but not limited to, cameras, reflectance-based optical sensors, triangulating reflectance sensors that use a separated emitter-receiver to estimate distance, electromagnetic impedance sensors that measure a change in dielectric or magnetic properties in the space an item might occupy, sensors that measure a change in acoustic impedance such as time of reflection or cavity resonance, or the like. The above list of sensor devices is merely exemplary and any other suitable device(s) whether available now or invented hereafter may be used to accomplish the features of this and other modalities.

Figure 6:
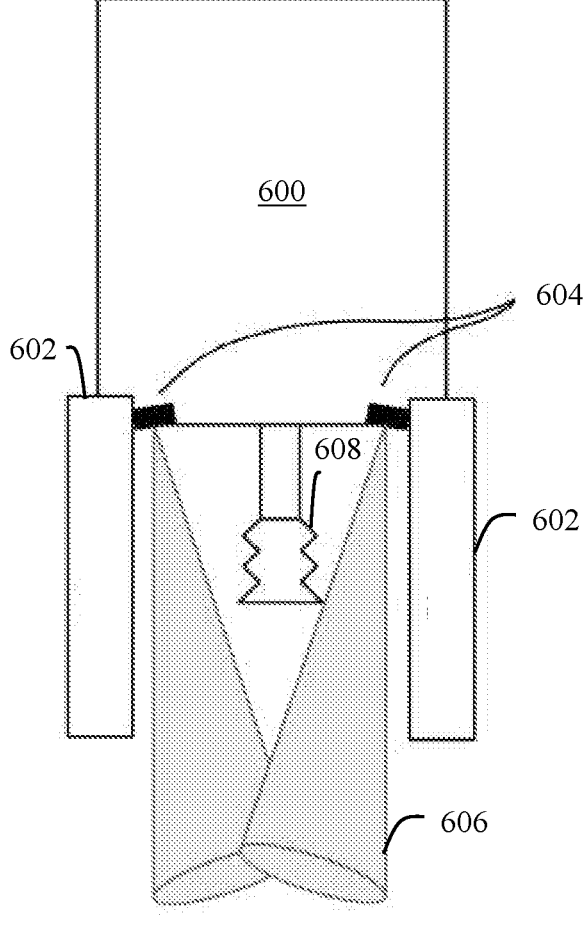
FIG. 6 illustrates a gripping device with finger portions and time-of-flight (ToF) sensors in accordance with one embodiment.

As seen in FIG. 3, the grasping space modality 308 may include time-of-flight (ToF) sensors 324, an infrared (IR) sensor 326 in operable connectivity with an infrared light emitting diode (IR LED) 328, a visible light camera 330, or the like. In some embodiments, the ToF sensors 324 may be embedded in the gripping device (e.g., in the palm of a gripping device). FIG. 6, for example, illustrates a gripping device 600 with finger portions 602. FIG. 6 also illustrates ToF sensors 604 and their corresponding fields of view 606. Also shown in FIG. 6 is a suction device 608 that may be used to grasp an item in addition to or in lieu of the finger portions 602.

The ToF sensors 604 may be positioned in an array such that their combined fields of view 606 cover a maximum amount of the grasping space with minimal interference from the finger portions 602 and the suction device 608. These sensors 604 (as well as other laser-based sensors) may be well-suited for the picking operations described herein as they have narrow fields of view 606. The ToF sensors 604 can consist of a single receiver or a 2D array receiver. With a ToF camera, certain pixels can be ignored if they interfere with the finger portions 602 or suction device 608, thereby increasing the contrast of the output.

One can also employ infrared proximity sensors 326 in a similar way. These sensors consist of IR LED 328 and receivers that can be either a single pixel or camera. The strength of the IR LED 328 can be tuned along with the gain of a receiver in such a way as to maximize the contrast of the response from items that are in a short range, ignoring the background and focusing on the grasping space.

If a multi-pixel IR camera is used then the pixels containing the suction cup or fingers of the gripping device can be ignored. Because the texture and color of the surface of an item can greatly impact the amount of reflected IR light, the emitter strength and receiver gain can be varied throughout the grasping of an item to allow the sensor to detect such items. A visible light camera 330 can also be used when aimed into the grasping space. A visible light emitter could be used and the gain of the camera reduced to similarly increase the response contrast of close range objects.

Acoustic ranging sensors 332 may be placed or otherwise embedded in the gripping device in a similar way to detect an item that is inside the grasping space. Depending on the geometry of the gripping device, a break-beam sensor could be used by placing an emitter and receiver in such a way that the beam passes through the space that might be occupied by an item without interfering with the finger portions or other features of the gripping device.

Referring back to FIG. 3, the third modality is the pressure detection modality 310. This modality may be used in embodiments in which a suction device 334 is used to perform or at least supplement the grasp attempt. Specifically, the pressure detection modality 310 refers to the application of sensors such as an air pressure sensor 336 in an airflow path to measure the vacuum that a suction device 334 applies to an item. The low pressure applied by the suction device 334 (e.g., a suction cup) can also be applied to a pressure sensor 336 in order to sense feedback from an item that is grasped and therefore blocking the suction device 334. When the suction device 334 is attached to an item, the pressure should be closer to the applied pressure and, when the suction cup is drawing air due to a failed grasp attempt, that the pressure measured by the sensor 336 will be closer to the ambient pressure in the environment.

The feedback from this sensor 336 is a function of the size of the opening in the suction device 334 and any blockage in the airflow path of the suction system. If the low pressure in the system is created using the Venturi effect, then the low pressure measured by this sensor 336 is also related to the high pressure input applied to the suction device 334.

A pressure sensor 336 can measure this high pressure to more accurately evaluate suction engagement. Generally, for a given pressure, a large suction device will be able to apply more force to an item as long as the item has a large enough suction site. If a particular filter is used in the suction system, then the low pressure level is correlated to the amount of blockage in the filter and can be used to indicate when the filter should be replaced. If multiple suction cups are used then multiple low pressure sensors can be placed as close to each suction cup as possible to determine which cups have an item attached thereto. This embodiment would require either flow restrictions associated with each suction cup or separate vacuum generators for each suction cup.

Accordingly, the pressure detection modality 310 measures air pressure associated with a section device 334. This pressure is correlated to the flow rate of air when a vacuum (not shown in FIG. 3) is engaged. This can be used to detect clogs in lines if, for example, it is known that no item is present. When detecting grasp success, this pressure can provide data regarding how much or little the system leaks.

Referring back to FIG. 3, the fourth modality shown is the item load detection modality 312. The item load detection modality 312 refers to the application of sensors in the mechanical load path of at least a portion of the gripping device and, in turn, an item that may be in the grasp of the gripping device. A load cell 338 such as a strain gauge can be incorporated into the structure of the gripping device such that it can detect force added by a grasped item. In this way, the weight of a grasped item can be determined from the load cell 338.

Figure 7:
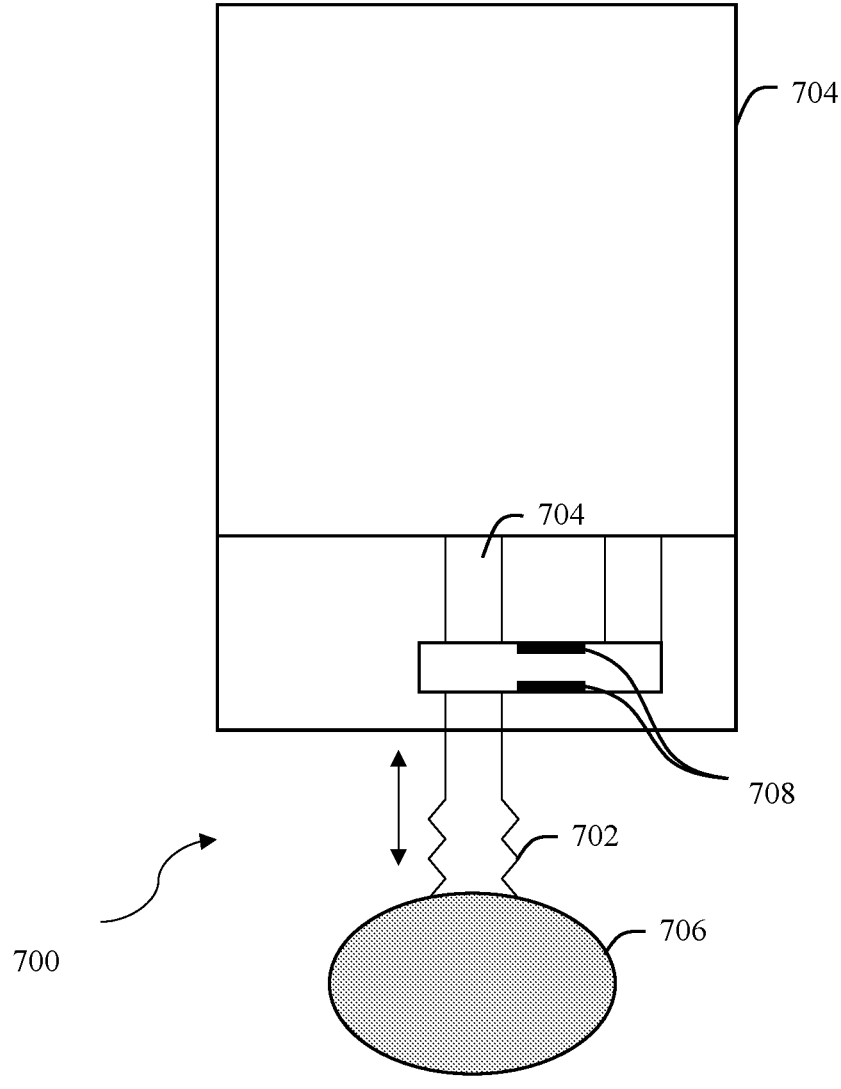
FIG. 7 illustrates a gripping device that implements a pressure detection modality and an item load detection modality in accordance with one embodiment.

FIG. 7 illustrates a gripping device 700 in accordance with one embodiment in which the gripping device 700 implements the pressure detection modality 310 and the item load detection modality 312. Specifically, the gripping device 700 of FIG. 7 includes a suction device 702 in operable connectivity with an air channel 704 for generating a suction force for grasping an item 706. The gripping device 700 also includes a strain gauge 708 positioned such that the added weight of the item 706 (when grasped by the suction device 702) can be determined from the strain gauge 708. The suction air flow can be run in a non-rigid manner so as to not interfere with the load that is measured by the strain gauge 708.

In the event that the gripping device is at an angle such that the weight of the grasped item 706 is not fully parallel to the direction of force measured by the strain gauge 708, the angle of the gripping device 700 can be accounted for to calculate the weight attributed to the item 706.

If the suction device 702 is moveable with respect to the rest of the gripping device 700, such as via a linear drive (not shown in FIG. 7), then the force on that linear drive mechanism can be sensed to approximate the weight of an item 706. An example of this would be a suction device mounted to rack and pinion drive or other types of devices such as those described in Applicant's co-pending PCT appls. nos. PCT/US2019/054558 and PCT/US2019/054560, both filed on Oct. 3, 2019, the contents of each of which are incorporated by reference as if set forth in their entirety herein.

The current consumed by the motor driving the rack can be sensed and used to determine the weight of a grasped item. This same principle could be applied to a motor that rotates the suction device. If the suction cup is moved by a piston or hydraulic means, then pressure measurement could be used to determine the weight of the item 706. The strain gauge 708 can also be integrated into the mounting structure of the entire gripping device for the same purpose. This would enable measuring the weight of an item (and accounting for the weight of the gripping device) that is grasped solely by finger portions such as those discussed previously.

Applicant notes that embodiments incorporating the pressure detection modality 310 and the item load detection modality 312 should account for any force exerted by air tubes and other equipment configured as part of the gripping device. These forces may also change with changes in pressure within the air tubes. Accordingly, in some embodiments such as those using only suction device(s) as a grasping mechanism, a strain gauge may be placed so that it can detect item weight regardless of pressure in the system.

The embodiments described herein may implement techniques or arrangements of the appropriate components and sensors to reduce false positives and false negatives. That is, these techniques may prevent incidents in which an item is detected but no item has been grasped, or vice versa. Generally, the odds of reducing false positives and false negatives increase with more sensors.

If the first modality 306 is used and forces or deflections of finger portion(s) 314 are detected, false positives may occur if the finger portions collide with each other or with a suction device (if used). Accordingly, the gripping device may be designed such that finger portions are positioned so that, at the point of maximum actuation, there is no or minimal intersection between the finger portions. For example, the finger portions may be spaced apart from each other by a required distance. However, this distance must be balanced against requirements to grasp small or thin items.

Figures 8A, 8B:
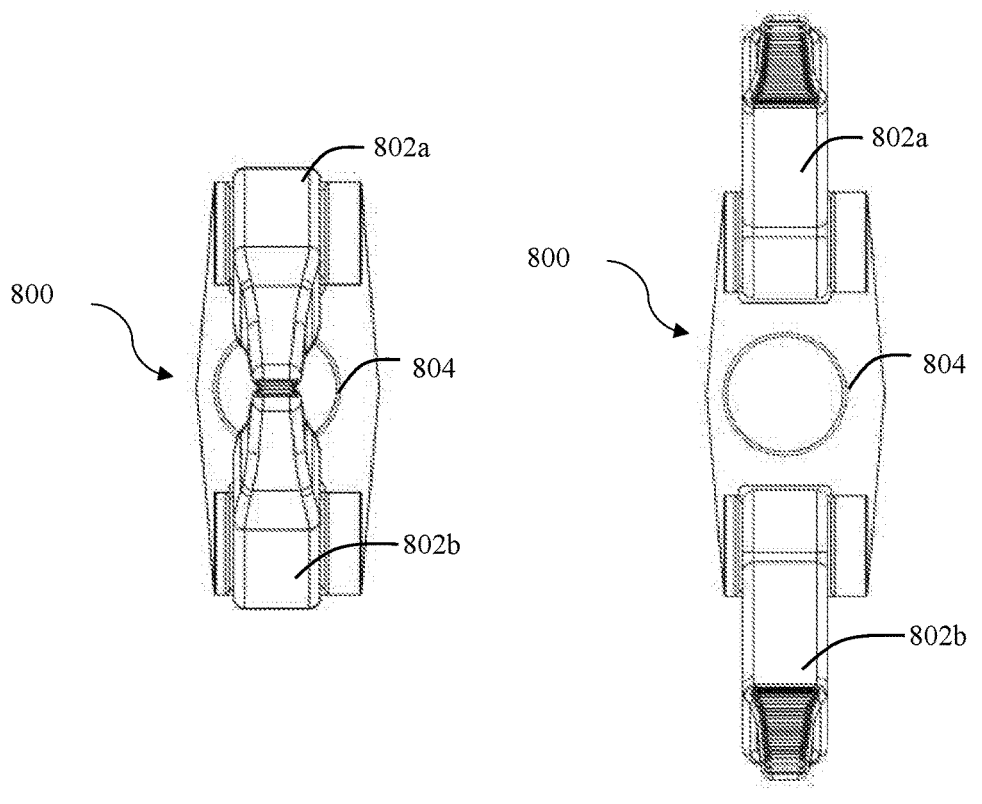
FIGS. 8A & B illustrate front views of a palm of a gripping device in accordance with one embodiment.

FIGS. 8A & B illustrate front views of a palm 800 of a gripping device in accordance with one embodiment. In this embodiment, the palm 800 includes two finger portions 802_a-b_ that are opposed to each other around a suction device 804. Specifically, FIG. 8A illustrates the finger portions 802_a-b_ in a "closed" position in which they are actuated to close on and contact an item (not shown in FIGS. 10A & B). Although FIG. 8A illustrates the finger portions 802_a-b_ contacting each other, they likely will not contact each other directly in the closed position during the operation as they would ideally be contacting a grasped item therebetween.

FIG. 8B, on the other hand, illustrates the finger portions 802_a-b_ in an "open" position. The finger portions 802_a-b_ may be in the open position before executing a grasp attempt and after releasing a previously-grasped item.

Figures 9A, 9B:
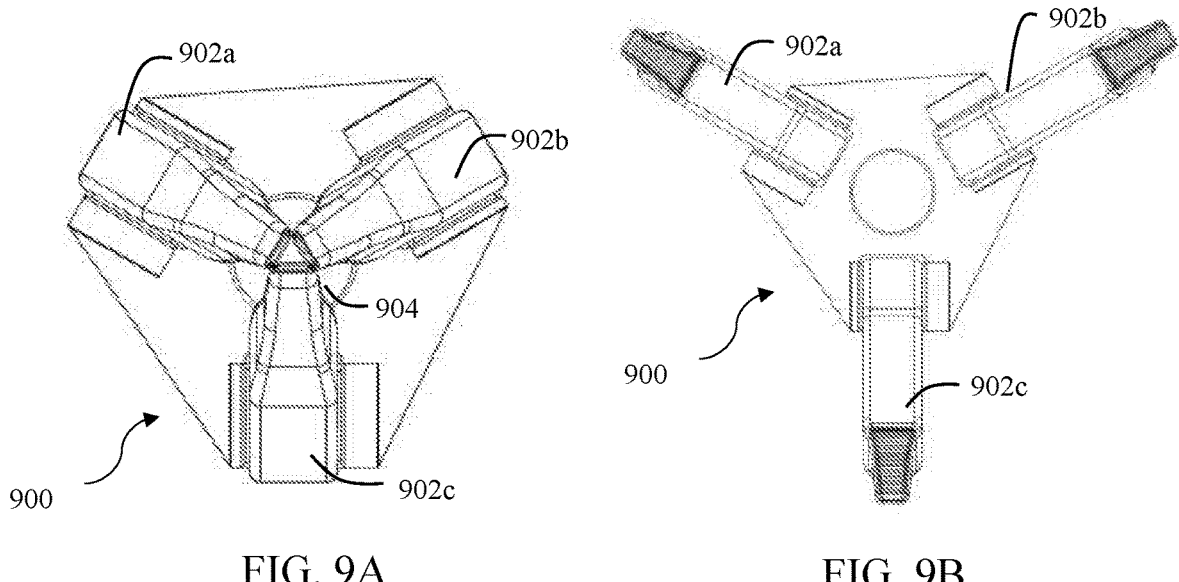
FIGS. 9A & B illustrate front views of a palm of a gripping device in accordance with another embodiment.

FIGS. 9A & B illustrate front views of a palm 900 of a gripping device in accordance with another embodiment. In this embodiment, the palm 900 includes three finger portions 902_a-c_ that are positioned around a suction device 904. Specifically, FIG. 9A illustrates the finger portions 902_a-c_ in a "closed" position in which they are actuated to close on and contact an item (not shown in FIGS. 9A & B). Although FIG. 9A illustrates the finger portions 902_a-c_ contacting each other, they likely will not contact each other directly in the closed position during operation as they would ideally be contacting a grasped item therebetween.

FIG. 9B, on the other hand, illustrates the finger portions 902_a-c_ in an "open position. The finger portions 902_a-c_ may be in the open position before executing a grasp attempt and after releasing a previously-grasped item.

Figure 10A:
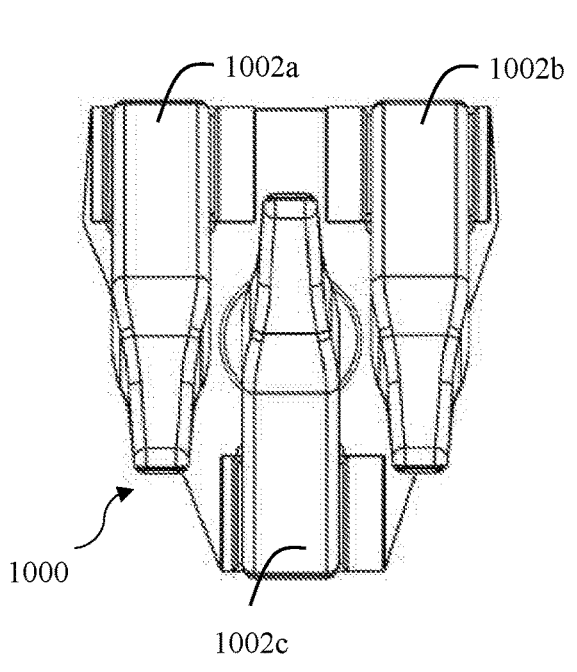
FIGS. 10A & B illustrate front views of a palm of a gripping device in accordance with another embodiment.

FIGS. 10A & B illustrate front views of a palm 1000 of a gripping device in accordance with another embodiment. In this embodiment, the palm 1000 includes three finger portions 1002*a-c* that are positioned about a suction device 1004. Specifically, FIG. 10A illustrates the finger portions 1002*a-c* in a "closed" position in which they are actuated to close on and contact an item (not shown in FIGS. 10A & B).

As opposed to FIGS. 9A & B, however, the finger portions 1002*a-c* are not positioned at equal distances from each other. Rather, finger portions 1002*a* and 1002*b* are parallel with each other and are positioned on opposite sides of the suction device 1004 from the finger portion 1002*c*. Accordingly, the finger portions 1102*a-c* will not intersect with or otherwise contact each other during actuation.

Figure 10B:
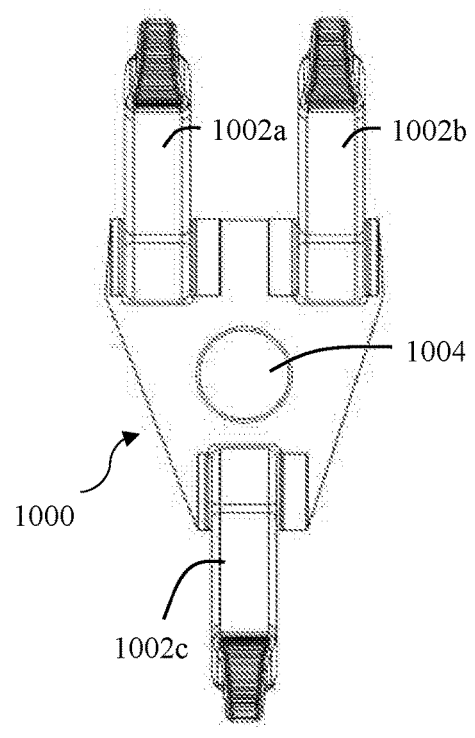

FIG. 10B illustrates the finger portions 1002*a-c* in an "open" position. The finger portions 1002*a-c* may be in the open position before executing a grasp attempt and after releasing a previously-grasped item.

Figure 11A:
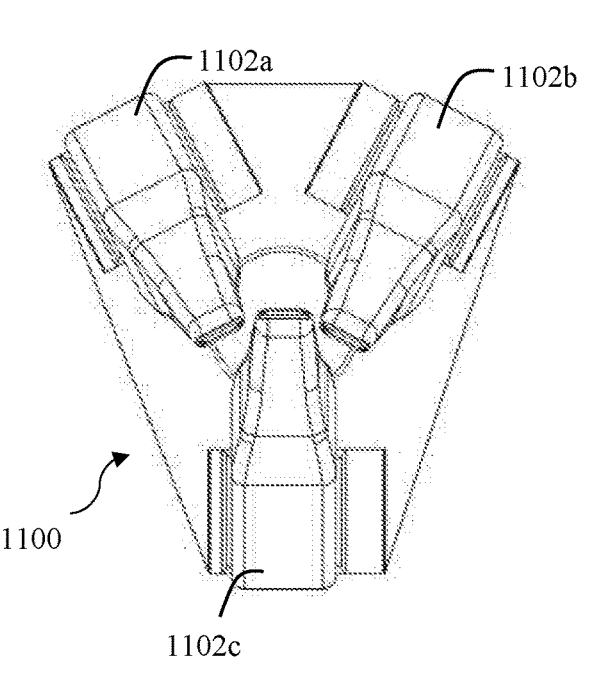
FIGS. 11A & B illustrate front views of a palm of a gripping device in accordance with still another embodiment.

FIGS. 11A & B illustrate front views of a palm 1100 of a gripping device in accordance with another embodiment. In this embodiment, the palm 1100 includes three finger portions 1102*a-c* that are positioned about a suction device 1104. Specifically, FIG. 11A illustrates the finger portions 1102*a-c* in a "closed" position in which they are actuated to close on and contact an item (not shown in FIGS. 11A & B).

As opposed to FIGS. 9A & B, however, the finger portions 1102*a-c* are not positioned at equal distances from each other. Rather, finger portions 1102*a* and 1102*b* are positioned on opposite sides of the suction device 1104 from the finger portion 1102*c*. Accordingly, the finger portions 1102*a-c* will not intersect with or otherwise contact each other during actuation. Unlike the configuration of FIGS. 10A & B, however, finger portions 1102*a* and 1102*b* are not parallel with each other.

Figure 11B:
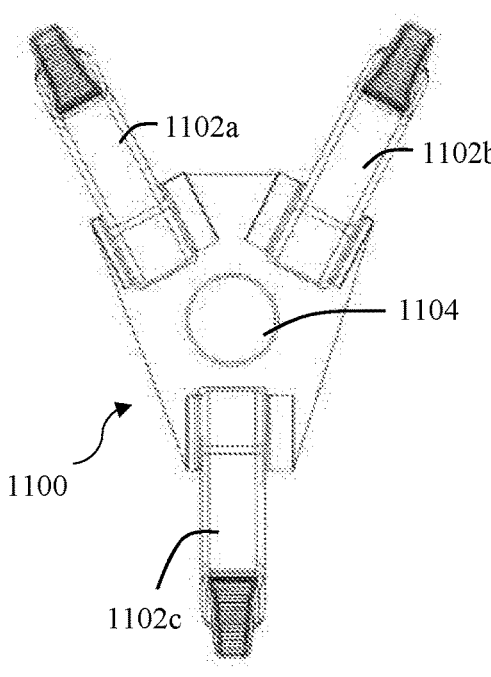

FIG. 11B illustrates the finger portions 1102*a-c* in an "open" position. The finger portions 1102*a-c* may be in the open position before executing a grasp attempt and after releasing a previously-grasped item.

The finger portions may be actuated to contact the grasped item(s) in a variety of ways. For example, the finger portions may move linearly, rotate around a base, or be curled in via a tendon or linkage train. The type of actuation techniques used may vary as long as the features of the various embodiments described herein may be accomplished Similar techniques may be used to reduce false positives in conjunction with the grasping space modality 308. As discussed above, the grasping space modality 308 is primarily optical in nature (e.g., by relying on the ToF sensors 324 or the amplitude/phase of a reflected emission from a light source).

By manipulating the sensor field of view and the timing of when the sensor output is sampled, it is possible to minimize the detection of the parts of the gripping device itself. An example of this is shown in FIGS. 12 & 13, which shows a gripping device 1200 and 1300, respectively, in accordance with other embodiments. The gripping device 1200 includes ToF optical sensors 1202 have been integrated into a flexible or rigid printed circuit assembly. The sensors 1202 may be LIDAR-based, sonar-based, vision-based, or the like.

As seen in FIG. 12, the ToF sensors 1202 are positioned so that the field of view 1204 does not overlap with the suction cup 1206 when it is in the partially retracted position that is typically used with holding an item (not shown in FIG. 12) in combination of the finger portion(s) 1208. In some embodiments, the ToF sensors 1202 may be angled in any appropriate way to obtain the desired fields of view. The sensors 1202 are also positioned in between the finger portions 1208 so that the finger portions 1208 themselves do not cause false-positive errors.

FIG. 13 similarly includes ToF sensors 1302 that may be similar to the sensors 1202 of FIG. 12. As seen in FIG. 13, the sensors 1302 are positioned such that their fields of view 1304 are not interfered with by the finger portions 1306.

FIG. 14 depicts a flowchart of a method 1400 for performing a picking operation in accordance with one embodiment. The system 300 of FIG. 3 (or at least select components thereof) may perform the steps of method 1400.

Step 1402 involves positioning a gripping device with respect to an item to be grasped. The gripping device may be configured with any suitable transportation mechanisms to enable the gripping device to be positioned at a picking location. Or, in some embodiments, the gripping device may be at least temporarily fixed at a pick location (e.g., near a container, container belt, shelf, or the like). Accordingly, this step involves positioning the gripping device at a location at which the gripping device can perform a picking operation.

Step 1404 involves executing a first picking operation using the gripping device to obtain a grasp on the item. For example, finger portions and/or one or more suction devices such as those discussed previously may execute the picking operation.

Step 1406 involves executing, to determine whether the gripping device has obtained a grasp on the item, at least two of: a force detection procedure to detect a force applied to a portion of the gripping device, a grasping space detection procedure to detect an item in grasping range of the gripping device, a pressure detection procedure configured to detect pressure in an airflow path, and an item load detection procedure to detect force in a mechanical load path of the gripping device.

Step 1408 involves determining whether the first picking operation was successful. In other words, step 1508 determines if the gripping device grasped the item.

Step 1408 may be accomplished in a number of ways. In some embodiments, the first picking operation may be determined to successful if any one of the modalities implemented in step 1406 determine that it was successful. In this case, the method 1500 may proceed to step 1410 to complete the pick-and-place operation. In some embodiments, method 1500 may require that more than one modality classify the first picking operation as successful before the method proceeds to step 1410. For example, in some embodiments, if any of the implemented modalities return a negative classification, method 1400 may determine that the gripping device did not successfully grasp the item.

Other embodiments may be more hierarchical in nature. For example, if the pressure detection modality 310 reports that a picking operation was a success, then method 1400 may accept that the picking operation was a success even if other modalities determined it was not a success.

Still other embodiments may require positive classifications from a combination of certain modalities. For example, positive classification from two modalities taken singularly may not be sufficient for method 1400 to determine the gripping device has successfully grasped an item. However, taken the positive classifications together, method 1400 may accept that the gripping device has successfully grasped the item.

Some embodiments may implement machine learning logic to outputs from the modalities and make the determination in step 1508. For example, the gripping device may be trained by attempting to grasp a variety of items and using external sensors to verify the success or failure of the test attempts.

In some cases, the gripping device may have attempted to grasp the item but failed. For example, finger portions of the force detection modality may have attempted to close around the item to grasp it, but for some reason failed to sufficiently secure the item. As another example, a suction device may have attempted to contact an item with a sufficient suction force such that the item stays in contact with the suction device. However, the suction device may have failed in doing so if the suction device did not contact a sufficiently flat surface of the item or the suction force was not strong enough.

If both of these cases were to occur (and none of the other modalities were implemented), the result would be that zero positive classifications are returned. It is possible that one modality returns a positive classification and that another modality returns a negative classification. However, and as in method 1600, the system may be configured to require that at least two modalities return a positive classification before proceeding to step 1610, which involves operably positioning the gripping device at a place location upon determining the first picking operation did obtain a grasp on the item based on output from the at least two procedures and placing the item at the place location.

If less than two modalities returned a positive classification, the system may assume that the gripping device did not grasp the item. In this case, the method 1600 may proceed to step 1608 which involves executing a second picking operation to obtain a grasp on the item upon determining the first picking operation did not obtain a grasp on the item based on output from the at least two procedures. Accordingly, the steps of the method 1600 may be repeated or otherwise iterated until the gripping device grasps the item.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A system for performing a picking operation, the system comprising:
   a gripping device configured to execute a first picking operation to obtain a grasp on an item;
   a control module;
   a force detection modality configured to provide a first data output indicative of a detected force applied to a portion of the gripping device,
   a grasping space modality configured to provide a second data output indicative of a detected item in grasping range of the gripping device,
   a pressure detection modality configured to provide a third data output indicative of a detected pressure in an airflow path, and
   an item load detection modality configured to provide a fourth data output indicative of a detected force in a mechanical load path of the gripping device;
   wherein the control module is configured to:
      receive the first data output, second data output, third data output, and fourth data output; and
      determine that the gripping device did not grasp the item based on the second data output indicating a positive classification and the first data output, third data output, and fourth data output indicating negative classifications.

2. The system of claim 1 wherein the gripping device is further configured to execute a second picking operation to obtain a grasp on the item upon the control module determining the first picking operation did not obtain a grasp on the item.

3. The system of claim 2 wherein the system is configured to operably position the gripping device at a place location upon the control module determining the second picking operation did obtain a grasp on the item, and wherein the gripping device is further configured to place the item at the place location.

4. The system of claim 1 wherein the gripping device includes at least one finger portion, and the force detection modality is configured to detect a force applied to the at least one finger portion.

5. The system of claim 1 wherein the first data output relates to a force generated by a portion of the gripping device gathered by the force detection modality by measuring at least one of air pressure, motor torque, series elastic deflection, servo tracking error, and rotational position of at least one finger portion.

6. The system of claim 1 wherein the control module is configured to instruct the gripping device to execute a second picking operation upon:

at least two of the first, second, third, or fourth data output indicating that the gripping device grasped the item, and one of the first, second, third, or fourth data outputs indicating that the gripping device did not grasp the item.

7. The system of claim 1 wherein the pressure detection modality includes a pressure sensor embedded in a structure of the gripping device to detect a suction force from a suction device, and the item load detection modality includes a strain gauge operably positioned within the structure to detect a load force resultant from lifting the item.

8. The system of claim 1 wherein:

the force detection modality includes at least one finger portion configured to grasp the item, and the grasping space modality includes at least one range-based sensor that is each operably mounted on the gripping device to view a grasping space, and wherein the at least one finger portion and the at least one range-based sensor are operably positioned so that the finger portion does not interfere with the view of the grasping space.

9. The system of claim 8 wherein the range-based sensor is operably positioned within a palm of the gripping device.

10. The system of claim 9 wherein the force detection modality includes at least one finger portion configured to grasp the item, the finger portion including:

a first segment configured with a Hall Effect sensor, a second segment configured with a magnet, and a bend point operably positioned between the first segment and the second segment, wherein the first data output is indicative of whether the finger portion has grasped an item and based on a distance between the magnet of the second segment and the Hall effect sensor of the first segment.

11. The system of claim 1 further comprising sensors configured with the gripping device.

12. A method for performing a picking operation, the method comprising:

positioning a gripping device with respect to an item to be grasped;

executing a first picking operation using the gripping device to obtain a grasp on the item;

executing, to determine whether the gripping device has obtained a grasp on the item, a plurality of procedures, the plurality of procedures including:

a force detection procedure to provide a first data output indicative of a detected force applied to a portion of the gripping device, a grasping space detection procedure to provide a second data output indicative of a detected item in grasping range of the gripping device, a pressure detection procedure to provide a third data output indicative of a detected pressure in an airflow path, and an item load detection procedure to provide a fourth data output indicative of a detected force in a mechanical load path of the gripping device;

receiving the first data output, second data output, third data output, and fourth data output; and determining that the gripping device did not grasp the item based on the second data output indicating a positive classification and the first data output, third data output, and fourth data output indicating negative classifications.

13. The method of claim 12 further comprising executing a second picking operation to obtain a grasp on the item upon determining the first picking operation did not obtain a grasp on the item.

14. The method of claim 13 further comprising:

operably positioning the gripping device at a place location upon determining the first picking operation did obtain a grasp on the item based, and placing the item at the place location.

15. The method of claim 12 wherein the gripping device includes at least one finger portion, and executing the force detection procedure includes measuring at least one of current draw, torque output, air pressure, air flow rate, and rotational position of at least one finger portion.

16. The method of claim 13 further comprising:

receiving at least two of the first, second, third, or fourth data output indicating that the item has been grasped;

receiving one of the first, second, third, or fourth data output indicating that the item has not been grasped; and executing a second picking operation.

17. The method of claim 12 wherein executing the pressure detection procedure includes detecting a suction force in a structure operably connected to a suction device, and executing the item load detection procedure includes detecting a load force resultant from lifting the item.

18. The method of claim 12 wherein one of the at least two procedures is the force detection procedure, and the gripping device includes at least one finger portion including:

a first segment configured with a Hall Effect sensor, a second segment configured with a magnet, and a bend point operably positioned between the first segment and the second segment, wherein the first output signal is of whether the finger portion has grasped an item and is based on a distance between the magnet of the second segment and the Hall effect sensor of the first segment.

19. The method of claim 12 further comprising determining that the first picking operation was successful upon at least two of the first, second, third, or fourth data output indicating picking operation was successful.

* * * * *